United States Patent
Dan

(10) Patent No.: US 6,371,376 B1
(45) Date of Patent: Apr. 16, 2002

(54) PCMCIA CARD WITH SECURE SMART CARD READER

(76) Inventor: Ho J. Dan, 6F, 122 San-Ming Road, Chupei, Hsinchu Hsien (TW)

(*) Notice: Subject to any disclaimer, the term of this patent is extended or adjusted under 35 U.S.C. 154(b) by 0 days.

(21) Appl. No.: 09/293,543

(22) Filed: Apr. 16, 1999

(51) Int. Cl.[7] .......................... G06K 19/06; G06K 7/00
(52) U.S. Cl. ...................... 235/486; 235/441; 235/492
(58) Field of Search ..................... 380/25, 23; 235/375, 235/441, 493, 492, 382, 382.5, 379, 380, 486, 487

(56) References Cited

U.S. PATENT DOCUMENTS

| | | | |
|---|---|---|---|
| 5,638,530 A | * 6/1997 | Pawate et al. | 395/442 |
| 5,785,666 A | * 7/1998 | Costello et al. | 600/595 |
| 5,804,971 A | * 9/1998 | Cumming et al. | 324/438 |
| 5,902,991 A | * 5/1999 | Kumar | 235/492 |
| 5,923,759 A | * 7/1999 | Lee | 380/25 |
| 6,052,783 A | * 4/2000 | Quak et al. | 713/213 |
| 6,134,114 A | * 10/2000 | Ungermann et al. | 361/737 |
| 6,140,936 A | * 10/2000 | Armstrong | 340/825.34 |
| 6,182,900 B1 | * 2/2001 | Wiehler | 235/492 |
| 6,315,205 B1 | * 11/2001 | Bates, III | 235/479 |

OTHER PUBLICATIONS

US2001/0037418 A1, PGPUB, Schaefer, "Direct Processor Access Via An External Multi–Purpose Interface", Nov. 1, 2001.*

* cited by examiner

Primary Examiner—Thien M. Le
(74) Attorney, Agent, or Firm—Tung & Assoicates

(57) ABSTRACT

A system is disclosed for incorporating a security feature in a PCMCIA memory card or like instrument for protecting information contained in electrical signals being exchanged through the PCMCIA card between a source card containing the information, e.g., a smart IC card, and a computer in which the information is used. PCMCIA cards are accomodatable in a special input slot in laptop or notebook type computers having an I/O interface that cooperates with a similar interface on an edge of the card. The interface is coupled, for transferring signals to and from the computer, to a PCMCIA chip in the card, which chip may also be coupled to a card reader having an I/O contact portion on another edge for mating with the edge of a smart card to transfer signals there between and to and from the interface to the laptop or notebook. The card reader includes a security processor, coupled to the PCMCIA chip, for encrypting and decrypting information and data transferred through the PCMCIA card between the card reader and the interface to the PC. The security processor has an associated memory for storing information and programming therein and the combination operates to protect the information or data in the PCMCIA card memory or the smart card from undesired access through the computer from any network to which the computer may be connected.

18 Claims, 1 Drawing Sheet

PCMCIA CARD WITH SECURE SMART CARD READER

FIELD OF THE INVENTION

The present invention generally relates to PCMCIA cards and, more particularly, to a PCMCIA card including a smart card reader and a security feature to control the information transferred between the smart card and a PCMCIA interface in a computer.

BACKGROUND OF THE INVENTION

Personal computers (PCs) are fitted with I/O slots for exchanging electrical signals indicative of information according to standard transmission protocols, and particularly laptop or notebook type computers, are provided with input slots that accept memory cards for exchanging data in accordance with the Personal Computer Memory Card Interface Association (PCMCIA) standard interface arrangement. Smart cards and similar instruments are known for use in storing data in connection with identification and commercial transactions. The memory or PCMCIA cards can be provided with readers that will transfer data between the smart cards and a PCMCIA interface for processing in a computer. With a PCMCIA card having this capability, a user may transact a home shopping type purchase by phone or the Internet, or otherwise, by transferring the pertinent smart card data through the PCMCIA memory card to the computer and on to a phone or Internet transmission. One caution in this regard is the problem of securing the content of the data when transferred to the interface, since beyond the interface it can become vulnerable to being accessed by unauthorized sources in many ways. At present no system exists for achieving adequate security in exchanging data between a smart card or other such instrument and computer connected facilities, such as the Internet, using a memory card as the intermediary.

It is therefore an object of the present invention to provide a security system to protect the integrity of data transferred between a smart card or like identification instrument and computer accessible systems, such as the Internet.

SUMMARY OF THE INVENTION

In accordance with the present invention, a method and means are provided for incorporating a security feature in a memory card or like instrument for protecting information contained in electrical signals being exchanged through the memory card between a source card containing the information and a computer in which the information is used. In a preferred embodiment the memory card is a PCMCIA card through which electrical signals, indicative of information and/or data, are transferred between a personal computer (PC), through a PCMCIA interface, and a smart IC card or other source of identification and/or commercial data, such as a credit card. PCMCIA cards are adapted to be accommodated in a special input slot in a personal computer, and particularly of the laptop or notebook type, which slot has an I/O interface arrangement that cooperates with a similar interface arrangement on an edge of the card. The interface design for transferring signals to and from the computer includes a PCMCIA chip in the card, which card may also be provided with a card reader having an I/O contact portion on another edge for mating with the edge of a smart card or like device to transfer signals therebetween and to and from the interface to the laptop or notebook. The invention embodies a card reader designed to include a safety or security processor, coupled to the PCMCIA chip, for encrypting and decrypting information and data transferred through the PCMCIA card between the card reader and the interface to the PC. The security processor has an associated memory for storing information and programming therein and the combination operates to protect the information or data in the PCMCIA card memory or the smart card from undesired access through the computer from any network to which the computer may be connected. Thus, the invention adds a security system to the PCMCIA card for this purpose.

BRIEF DESCRIPTION OF THE DRAWINGS

These and other objects, features and advantages of the present invention will become apparent from the following detailed description and the appended drawing in which.

DETAILED DESCRIPTION OF THE PREFERRED EMBODIMENT

Figure 1:
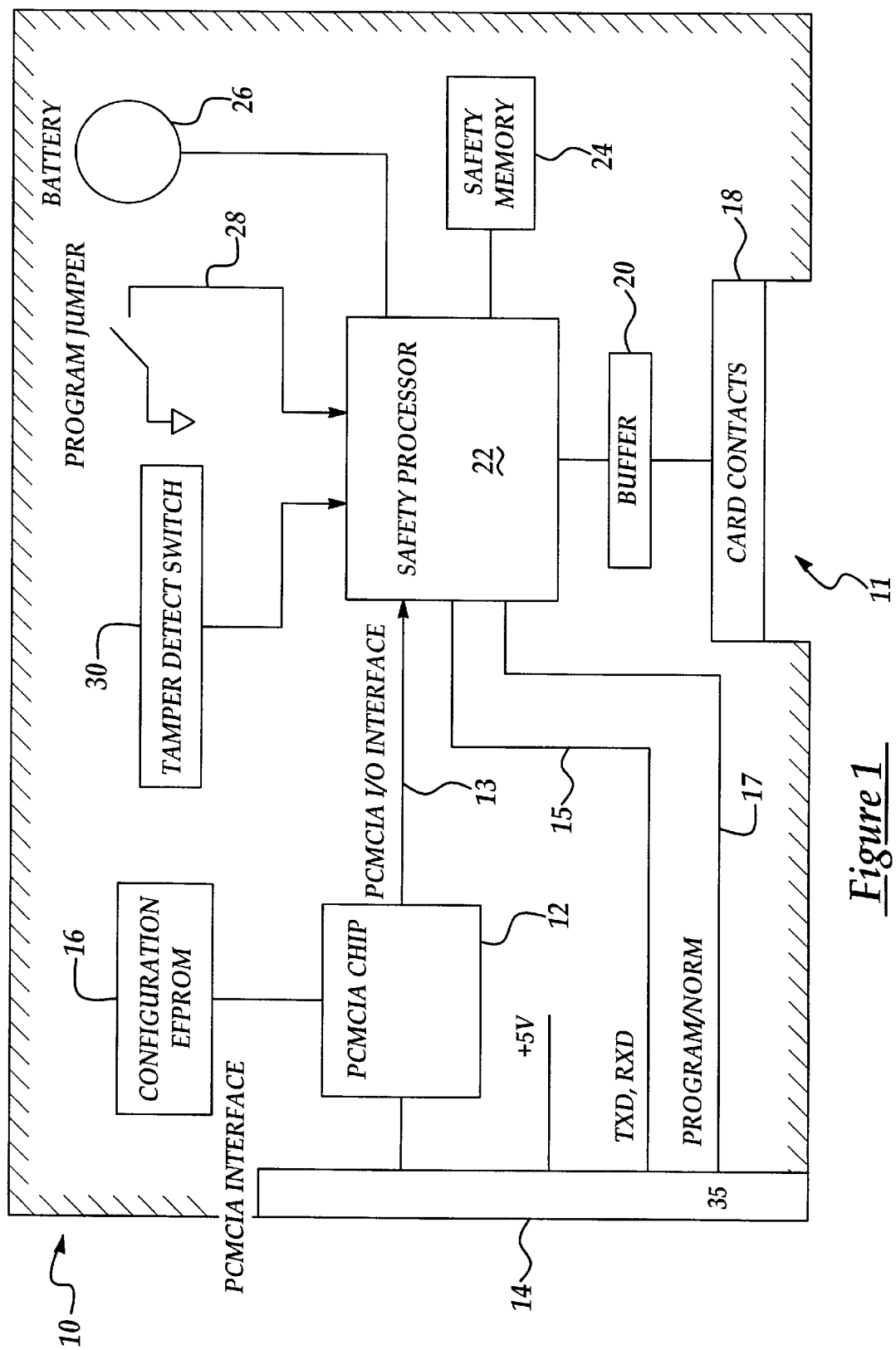
FIG. 1 is a block diagram illustrating a security system for protecting the integrity of data transferred between a smart IC card and the Internet or Intranet in accordance with the present invention.

The present invention is directed to providing a method and means wherein a security feature is incorporated in a memory card or like instrument for securing information and/or data being transferred between a source card containing the information and data and a computer in which the information and data are used. In a preferred embodiment the invention is applied in a PCMCIA card through which electrical signals, indicative of information and/or data, are transferred between a personal computer, through a PCMCIA interface, and a smart IC card or other source of identification and/or commercial data, such as a credit card. PCMCIA cards are adapted to be accommodated in a special input slot in a personal computer, and particularly of the laptop or notebook type, which slot has an I/O interface arrangement that cooperates with a similar interface arrangement on an edge of the card. The interface design for transferring signals to and from the computer is in accordance with a standard defined by the Personal Computer Memory Card Interface Association, hence the PCMCIA interface. The PCMCIA card may also be provided with a card reader having an I/O contact portion on another edge for mating with the edge of a smart card or like device for transferring signals therebetween and to and from the interface to the laptop or notebook. The information and data transferred through the PCMCIA card may be stored therein and altered for handling by the interface. However, at present, there is normally no provision for protecting the information or data in the PCMCIA card memory or the smart card from undesired access through the computer from any network to which the computer may be connected. The present invention is directed to adding a security system to the PCMCIA card for this purpose and embodies the combination of components as shown in FIG. 1.

Referring to FIG. 1, it will be seen that the PCMCIA card 10 contains a commercially-available PCMCIA chip 12 which is coupled to a PCMCIA interface contact strip 14 on one side of the card and to a configuration EEPROM 16. The side of the card 10 fitted with the interface contact strip 14 is designed to be inserted into a dedicated slot of a PC, particularly a PC of the laptop or notebook type, and to cooperate with a mating contact arrangement in the slot for exchanging electrical signals between the card 10 and the PC (not shown). The PCMCIA card 10 has a card contact 18, on another edge for accommodating a smart IC card, or suitable credit card, to exchange electrical signals between the PCMCIA card 10 and the smart IC card (not shown) to read and transfer information. The card contacts 18 are coupled to a buffer 20 which controls the exchange of information between the card contacts 18 and a signal processing unit 22, the combination acting as a basic smart card reader. Processor or chip 22 is coupled by line 13 to the PCMCIA chip 12 for exchanging PCMCIA I/O interface signals and also has connections 15 and 17 for transmitting and receiving data (TXD and RXD) and exchanging normal programming, respectively, to and from the interface 14. A +5 V source of power from the PC is provided through the interface 14 to operate the PCMCIA card 10.

In accordance with the present invention, processing unit 22 is a security processor or chip that functions to encrypt and decrypt the information and/or data being read and transferred between the smart IC card and the PC. Processor 22 has an associated security memory 24 for storing security data and programming. A power source, e.g., battery 26, is provided for supplying power to maintain the programming and identity information in the processor 22 and memory 24. In order to prevent tampering with the security chip 22 and memory 24, a tamper detect switch 30, such as a physical temperature switch, is disposed in the card 10 and will send a distorting signal into the stored information rendering the card unusuable should the switch be disturbed.

In operation, the PCMCIA card 10 can be used to transfer information between it and the PC through the PCMCIA interface 14. The information may consist of data that is input to the card 10 through a card contact or PCMCIA interface, which data is in the form of stored information from an external memory or a memory within the PC, or of smart IC card or credit card identification information for purchasing merchandise, e.g., on the Internet to which the PC is connected, or through a TV or cable box or phone for home shopping. In any event, all data and information passing through the PCMCIA chip 12 can be encrypted or decrypted by the security chip 22 to insure against theft or tampering with the content of the transmitted signals.

It will therefore be seen that a PCMCIA card is disclosed which, in addition to a PCMCIA chip and a smart IC card reader, contains a security chip for encrypting and decrypting data and/or identification information that is transferred between the card and a PC laptop or notebook.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the invention.

The embodiment of the invention in which an exclusive property or privilege is claimed are defined in the following claims:

What is claimed is:

1. A transmission card device comprising:
a card transmission interface, on said device, for exchanging electrical signals in accordance with a standard protocol and adapted to be inserted into a computer slot containing a cooperating computer transmission interface for exchanging electrical signals in accordance with said standard protocol, wherein said standard protocol is that of the PCMCIA standard and said transmission interfaces comprise a PCMCIA interface;
first processor means, on said device, for exchanging electrical signals containing information with said card transmission interface;
reader means, on said device, for transferring electrical signals containing information to and from an external instrument containing information to be transferred as electrical signals; and
security processor means, on said device, coupled between said first processor means and said reader means, for encrypting and decrypting said information being transferred.

2. A device according to claim 1, wherein said security processor means comprises a security memory.

3. A device according to claim 2, further comprising a power source for maintaining information and programming in said security processor means.

4. A device according to claim 2, further comprising switch means for providing a path to enter programming into said security processor means.

5. A device according to claim 1, further comprising means for detecting tampering with said transmission card device.

6. A device according to claim 1, wherein said first processor means comprises a PCMCIA chip.

7. A device according to claim 1, wherein said reader means comprises a card reader.

8. A device according to claim 1, wherein said reader means comprises contacts for cooperating with a smart IC card reader.

9. A device according to claim 1, wherein said computer transmission interface comprises means for coupling power from said computer to operate said transmission card device.

10. A method for operating a transmission card device with a security feature, comprising the steps of:
providing a card transmission interface, for exchanging electrical signals in accordance with a standard protocol, on said transmission card device, wherein said standard protocol is that of the PCMCIA standard and said card transmission interface comprises a PCMCIA interface;
inserting said transmission card device into a computer slot containing a cooperating computer transmission interface for exchanging electrical signals in accordance with said standard protocol between the computer and said transmission card device;
exchanging electrical signals containing information through said computer and card transmission interfaces with a first processor on said transmission card device;
transferring through a reader, on said transmission card device, electrical signals containing information to and from an external instrument containing information to be transferred as electrical signals; and
coupling a security processor, on said transmission card device, between said first processor and said reader, for encrypting and decrypting said information being transferred.

11. A method according to claim 10, comprising the further step of providing a power source, on said transmission card device, for maintaining information and programming in said security processor.

12. A method according to claim 10, comprising the further step of providing a switch controlled path to enter programming into said security processor.

13. A method according to claim 10, comprising the further step of providing a tamper detecting switch in said transmission card device.

14. A method according to claim 10, wherein said first processor comprises a PCMCIA chip.

15. A method according to claim 10, wherein said reader comprises a smart card reader.

16. A method according to claim 10, wherein said computer transmission interface couples power from said computer to operate said transmission card device.

17. In a PCMCIA card having:

a PCMCIA interface;

first processor means for transferring electrical signals containing information to and from said PCMCIA interface;

a card reader for transferring electrical signals containing information to and from an external card containing information to be transferred as electrical signals;

wherein the improvement comprises:

second processor means, coupled to said first processor means and said card reader, for encrypting and decrypting said information contained in said electrical signals.

18. A card device comprising:

a PCMCIA interface;

first processor means for exchanging electrical signals containing information with said PCMCIA interface;

a card reader means for transferring electrical signals containing information to and from an external card containing information to be transferred as electrical signals; and security processor means, coupled between said first processor means and said card reader means, for encrypting and decrypting said information being transferred.

* * * * *